(12) United States Patent
Wang et al.

(10) Patent No.: US 11,645,272 B2
(45) Date of Patent: May 9, 2023

(54) METHOD, SYSTEM, DEVICE AND MEDIUM FOR QUERYING PRODUCT HISTORY

(71) Applicants: Beijing Zhongxiangying Technology Co., Ltd., Beijing (CN); BOE TECHNOLOGY GROUP CO., LTD., Beijing (CN)

(72) Inventors: Chuan Wang, Beijing (CN); Lijun Zeng, Beijing (CN); Jianfeng Zeng, Beijing (CN); Haijin Wang, Beijing (CN); Jianmin Wu, Beijing (CN); Nan Liu, Beijing (CN); Hong Wang, Beijing (CN); Dong Chai, Beijing (CN); Minyang Deng, Beijing (CN)

(73) Assignees: BEIJING ZHONGXIANGYING TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/410,723

(22) Filed: Aug. 24, 2021

(65) Prior Publication Data

US 2022/0129447 A1 Apr. 28, 2022

(30) Foreign Application Priority Data

Oct. 28, 2020 (CN) .......................... 202011174965.4

(51) Int. Cl.
*G06F 16/242* (2019.01)
*G06F 16/2458* (2019.01)
(Continued)

(52) U.S. Cl.
CPC ..... *G06F 16/242* (2019.01); *G05B 19/41875* (2013.01); *G06F 16/248* (2019.01); *G06F 16/2477* (2019.01)

(58) Field of Classification Search
CPC .. G06F 16/242; G06F 16/2477; G06F 16/248; G05B 19/41875
(Continued)

(56) References Cited

U.S. PATENT DOCUMENTS

2014/0337175 A1* 11/2014 Katzin ................. G06Q 20/326
705/26.62
2014/0337373 A1* 11/2014 Morsi .................... G06F 16/245
707/769

(Continued)

*Primary Examiner* — Joshua Bullock
(74) *Attorney, Agent, or Firm* — Myers Bigel, P.A.

(57) ABSTRACT

A method for querying a product history is disclosed. The method includes receiving a product query request including at least one product query parameter for a target product to a product graph database that stores a relational map constructed based on a manufacturing process of the target product and describing entities including product entities and manufacturing entities and entity relations therebetween involved in the manufacturing process, querying the product graph database according to the product query parameter to obtain product history data of the target product by searching for a product entity corresponding to the target product as a target product entity in the relational map according to the parameter, searching for associated manufacturing entities of the target product entity according to the entity relations, obtaining the product history data based on the associated manufacturing entities, and sending a notification message to notify obtained product history data.

18 Claims, 6 Drawing Sheets

(51) Int. Cl.
*G06F 16/248* (2019.01)
*G05B 19/418* (2006.01)

(58) Field of Classification Search
USPC .......................................................... 707/769
See application file for complete search history.

(56) References Cited

U.S. PATENT DOCUMENTS

| | | |
|---|---|---|
| 2017/0286502 A1* | 10/2017 | Bar-Or ...................... G06F 8/34 |
| 2020/0142935 A1* | 5/2020 | Venkatesan .......... G06F 16/9024 |
| 2020/0382556 A1* | 12/2020 | Woolward .......... G06F 16/9024 |
| 2021/0133170 A1* | 5/2021 | Maharajh .......... G06F 16/90335 |
| 2021/0149893 A1* | 5/2021 | Sehgal ..................... G06N 5/02 |
| 2021/0182659 A1* | 6/2021 | Makhija ................... G06N 3/04 |
| 2021/0303565 A1* | 9/2021 | Blackwood .......... G06F 16/2477 |
| 2022/0129447 A1* | 4/2022 | Wang .................. G06F 16/2477 |
| 2022/0292567 A1* | 9/2022 | Prasad ................. G06Q 10/087 |

* cited by examiner

METHOD, SYSTEM, DEVICE AND MEDIUM FOR QUERYING PRODUCT HISTORY

RELATED APPLICATION

The present application claims the benefit of Chinese Patent Application No. 202011174965.4 filed on Oct. 28, 2020, the entire disclosures of which are incorporated herein by reference.

TECHNICAL FIELD

The disclosure relates to the technical field of industrial big data, in particular to a method, system, device and medium for querying a product history.

BACKGROUND

A manufacturing execution system (MES) stores a manufacturing history of a product which records in detail manufacturing information of the product during fabrication. With the manufacturing history of the product, the source of a defective product can be traced and the range of product recalls can be narrowed, and thus losses caused by recalled products can be reduced. A traceable data model can not only record data about the manufacturing procedure completely, but also extend to aspects such as quality tracing and purchase tracing, which is of great importance to the enterprise manufacturing procedure control and the manufacturing procedure improvement.

Product history tracing is usually based on data stored in a relational database, but for a product history tracing based on a relational database, a query procedure has problems such as time consuming or complicated, which leads to a low efficiency of the defective product tracing.

SUMMARY

In light of the above problems or defects in the prior art, it is desirable to provide a method, system, apparatus and medium for querying a product history so as to improve the query efficiency of product history data.

In a first aspect, a method for querying a product history is provided according to the embodiments of this disclosure, the method comprising: receiving a product query request to a product graph database from a query device, the product query request including at least one product query parameter for a target product, the product graph database storing a relational map constructed based on a manufacturing process of the target product, the relational map describing entities including product entities and manufacturing entities involved in the manufacturing process and entity relations between the entities; querying the product graph database according to the product query parameter to obtain product history data of the target product, comprising: searching for a product entity corresponding to the target product as a target product entity in the relational map according to the product query parameter; searching for one or more associated manufacturing entities of the target product entity according to the entity relations described by the relational map; obtaining the product history data based on the associated manufacturing entities; and sending a notification message to the query device to notify it of the obtained product history data.

In a second aspect, a system for querying a product history is provided according to the embodiments of this disclosure, the system comprising: a product graph database, configured to store a relational map constructed based on a manufacturing process of a target product, the relational map describing entities including product entities and manufacturing entities involved in the manufacturing process and entity relations between the entities; a product history query apparatus, configured to receive a product query request including at least one product query parameter for the target product, query the product graph database according to the product query parameter to obtain product history data corresponding to the target product, comprising: search for a product entity corresponding to the target product as a target product entity in the relational map according to the product query parameter; search for one or more associated manufacturing entities of the target product entity according to the entity relations described by the relational map; obtain the product history data based on the associated manufacturing entities.

In a third aspect, an electronic device is provided according to the embodiments of this disclosure. The electronic device comprising a memory, a processor and a computer program stored on the memory and executable on the processor, the processor being configured to implement the method described in the embodiments of this disclosure when executing the program.

In a fourth aspect, a computer-readable storage medium is provided according to the embodiments of this disclosure, which has a computer program stored thereon. The computer program, when executed by a processor, causes the processor to implement the method described in the embodiments of this disclosure.

BRIEF DESCRIPTION OF DRAWINGS

By reading detailed description of the nonrestrictive embodiments with reference to the drawings below, other features, goals and advantages of this disclosure will become more obvious.

DETAILED DESCRIPTION OF EMBODIMENTS

Figure 1:
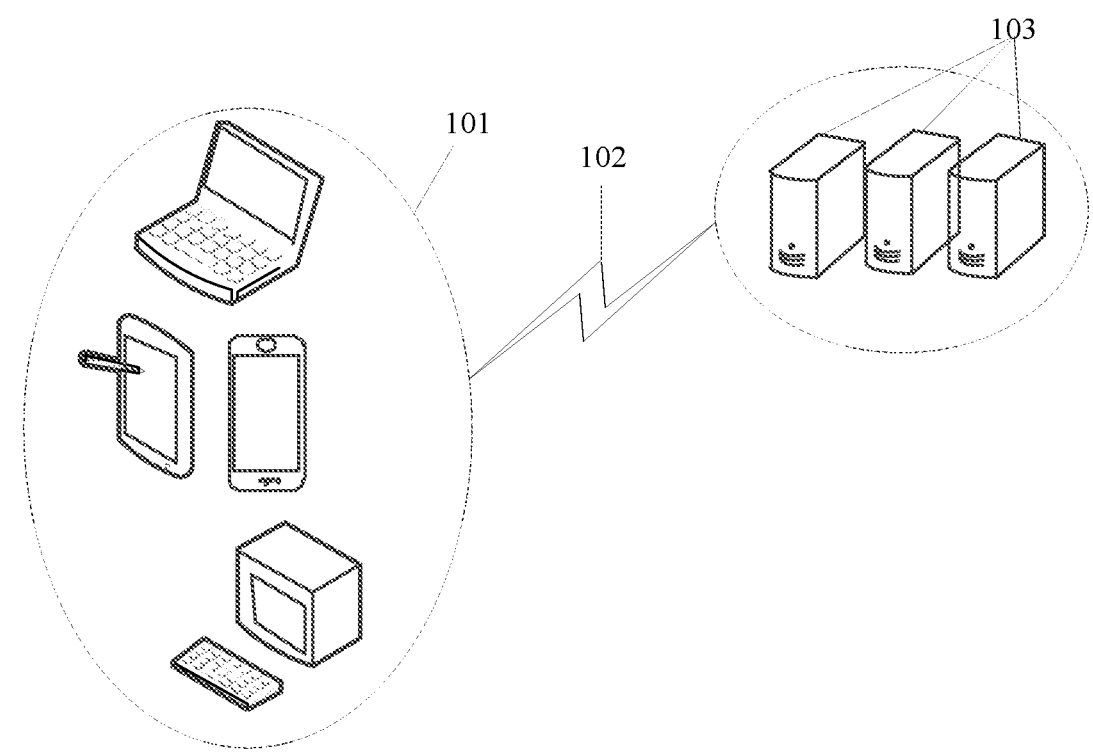
FIG. 1 shows a schematic view of an application scenario of a product history query solution according to an embodiment of this disclosure.

This disclosure will be further explained in detail in combination with the drawings and the embodiments. It can be understood that the specific embodiments described herein are only used for explaining related disclosure, instead of limiting this disclosure. Besides, it should be further noted that in order to facilitate the description, only portions related to this disclosure are shown in the drawings.

It should be noted that the embodiments in this disclosure and features of the embodiments can be combined with each other where no conflict is caused. This disclosure will be explained in detail with reference to the drawings and in combination with the embodiments.

FIG. 1 shows a schematic view of an application scenario of product history query according to an embodiment of this disclosure.

As shown in FIG. 1, a user can use a terminal device 101 to query a stored product history. The user can query information about a target product such as manufacturing history data (e.g., equipment history, repair history, etc.), or product index, e.g., defect rate and so on, by using a query client installed in the terminal device. For example, in the industry of semiconductor display, product history tracing or query can trace conditions of equipment and units of the equipment through which a product flows in the manufacturing process. The product history data may comprise detailed information of the equipment through which the product flows, including, e.g., temporal information and equipment parameters when the product flows through the equipment. The product history tracing or query can be used for yield analysis. For example, some yield indexes of a product flowing through different equipment are analyzed so as to analyze the machine error and thus guide the yield improvement.

The query client receives a query request inputted by the user and then sends the query request to a server 103, e.g., via a network 102. The query request may comprise but is not limited to a product parameter, a target limit condition and so on. The product parameter comprises but is not limited to a text type parameter of the product, e.g., a product ID, or an image type parameter of the product, e.g., an actual image taken for a defective product or an image of a sample corresponding to the product, etc. The target limit condition comprises but is not limited to a time limit parameter, e.g., a time range, a location limit parameter, e.g., a location limit range; an equipment group limit parameter, e.g., an equipment group identifier and so on.

The terminal device 101 may be a mobile device such as a smart phone, a tablet computer, smart glasses, etc., and it may also be an electronic device such as a desktop computer, but is not limited thereto.

The network 102 comprises but is not limited to a wireless network or a wired network, over which standard communication technologies and/or protocols are used. The network is usually the Internet, and it may also be any network, comprising but not limited to any combination of Local Area Network (LAN), Metropolitan Area Network (MAN), Wide Area Network (WAN), mobile, wired or wireless network, dedicated network or virtual dedicated network.

The server 103 executes a query program based on the query request sent by the terminal device 101 in order to find a result related to the query request. The result comprises but is not limited to product history data, index of interest for the product and so on. The server 103 may be an independent physical server, or a server cluster or a distributed system composed of a plurality of physical servers, or a cloud server providing basic cloud computing service such as cloud service, cloud database, cloud computing, cloud function, cloud storage, network service, cloud communication, middleware service, domain name service, security service, CDN, and big data and artificial intelligence platform.

The server 103 may further comprise a database server. The database server is arranged for storing a database related to product history query. In related arts, the database may be a relational database.

In a relational database, information such as defect information of the product, equipment history of the product, product coordinate, product ID is usually scattered in different data sheets. During the history tracing based on a relational database, interaction with a plurality of data sheets is required to retrieve the product history data and the product defect information. To take the industry of semiconductor display as an example, when joining product defect information, one same panel may have plural defects, each of which may be caused by plural different process steps. If each process step is considered as a level, the history tracing or query may involve a distribution relation with up to 3~4 levels. If the product history data is retrieved according to a relational database, and then the product defect information is analyzed based on the retrieved product history data, the query data amount will skyrocket.

For example, assuming there is a query request in a form of a composite input for 100,000 panels, and each panel has M defects on average, and each defect has N process segments, and each process segment has P equipments (EQP) and K units (UNIT), the resultant join data amount may reach 100000*M*N*(P+K). In other words, the number of the final resultant records is 100~1000 times that of the panels. Although only one composite query statement is run in the entire query procedure, data needs to be correlated by a join operation of plural data sheets in the relational database, which takes a long query time and thus leads to low query efficiency.

To solve the above problems, this disclosure proposes a technical solution for querying a product history, which may effectively save the query time and improve the query efficiency of the product history by constructing a new data system architecture of product history tracing.

Figure 2:
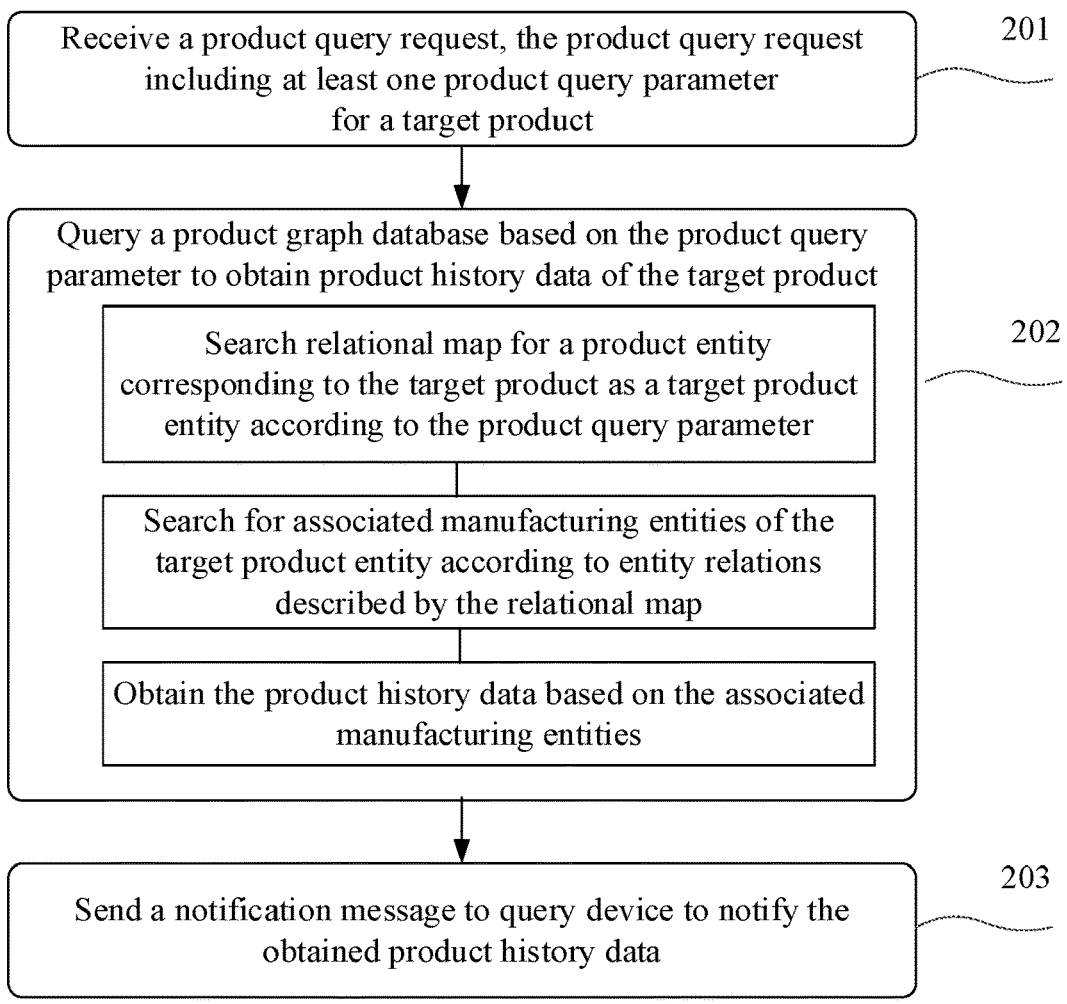
FIG. 2 shows an exemplary flow chart of a product history query method according to an embodiment of this disclosure.

FIG. 2 shows an exemplary flow chart of a product history query method according to an embodiment of this disclosure. The method comprises:

Step 201, receiving a product query request to a product graph database, the product query request including at least one product query parameter related to a target product.

The product graph database stores a relational map constructed based on a manufacturing process of the product. The relational map describes at least one of a plurality of manufacturing entities, a plurality of product entities, relations between manufacturing entities, relations between the manufacturing entities and the product entities, and relations between product entities involved in the manufacturing process. In an example, the product graph database comprises a relational map constructed based on the product entities, the manufacturing entities and the relations between the product entities and the manufacturing entities.

The relational map may represent the entities, entity relations and entity properties involved in the manufacturing process in the form of graphs. The relational map may be a graph search structure constructed based on entities and triplets. The entities may be manufacturing entities and product entities. The entity relations and the entity properties may be represented by means of triplets. For example, in a product graph database, an entity relation may be stored in the form of triplet "entity-relation-entity", and an entity property may be stored in the form of triplet "entity-property-property value".

The manufacturing entities may refer to manufacturing implementation bodies in respective phases during the manufacturing process from raw materials to final products. The manufacturing implementation bodies comprise but are not limited to factories and stations where the products are manufactured, equipment and units for implementing respective process steps of the products, and so on.

The product entities may refer to products outputted in each phase of the manufacturing process, which may have different states and/or shapes. For example, during the manufacturing process of a semiconductor display, the product entities comprise but are not limited to glass, half glass and panel. The product entities may also have corresponding properties. For instance, the properties of the product entities may comprise defect, product identifier, e.g., product ID, etc.

The relations between manufacturing entities may refer to body relations between the manufacturing implementation bodies. The body relations comprise but are not limited to a "containing" relation, e.g., a factory contains a station (factory→station), and a station contains an equipment (station→equipment), and an equipment contains a unit (equipment→unit).

The relations between product entities may refer to product relations between the products. The product relations comprise but are not limited to a product-related (e.g., cutting) relation, and a relation between the product and properties thereof. For example, the panel is related to (obtained by cutting) a half glass (panel→half glass), a half glass is related to (obtained by cutting) a glass (half glass→glass), and a panel is related to a defect (panel→defect), and a panel is related to a product ID (panel→product ID).

The relations between the product entities and the manufacturing entities may refer to product body relations between the product and the manufacturing implementation bodies thereof. The product body relations comprise but are not limited to a relation of product passing through equipment. For example, a glass passes through an equipment (glass→equipment), and a glass passes through a unit (glass→unit), and a half glass passes through an equipment (half glass→equipment), and a half glass passes through a unit (half glass→unit), and so on.

The product query request may be a request message containing one or more product query parameters received from a query device. Exemplarily, the product query parameter may comprise: a defect of a certain product, a time range related to a certain product, a product arrival rate of a certain product and so on. For example, an image of a defective product contained in the request message may be analyzed to obtain the product query parameter. Alternatively, the query parameter may also be inputted directly by a third party or a user. For instance, the user may manually input the range of the production time of a product to be queried. The request message may adopt any suitable format and/or carrier form. In some embodiments, the product query parameter may comprise an identifier corresponding to the product, e.g., a product ID.

Step 202, querying the product graph database according to the product query parameter to obtain the product history of the target product. Herein querying the product graph database according to the product query parameter comprises: searching for a product entity corresponding to the target product as a target product entity in the relational map according to the product query parameter; searching for one or more associated manufacturing entities of the target product entity according to the entity relations described by the relational map; obtaining the product history data based on the associated manufacturing entities.

Optionally, the associated manufacturing entity may be a manufacturing entity having entity relations with the target product entity in the relational map.

Additionally, the product history data may further comprise information of a product entity corresponding to the target product and/or information of a product entity having entity relations with the product entity found in the relational map according to the product query parameter. The information of entities comprises property information of the entities and/or relational information of the entities.

In some embodiments, the method further comprises: after the product history data of the target product is queried, a notification message may be sent to the query device so as to notify it of the queried product history data.

According to the embodiments of this disclosure, the manufacturing process of the product is modeled and described in a structured form by using the product graph database, which enables rapid and effective query of the product history data related to the product query parameter. Therefore, as compared with a query for a relational database, the query based on a product graph database according to the embodiments of this disclosure may achieve product history tracing on a large scale, thereby improving the query speed of the product history greatly.

In some embodiments, the product query parameter is a parameter related to the target product (i.e., the product to be queried). Therefore, a product entity of which property information matches with the product query parameter may be searched as the target product entity according to the entities described by the relational map. Optionally, information of the target product entity stored in the product graph database may be comprised in the product history data. Additionally or alternatively, it is also possible to search for a product entity of which related property information matches with the product query parameter as a first product entity according to the entities or entity relations described by the relational map, search for a second product entity related to the first product entity according to the product entity relations between the product entities described by the relational map, and determine the second product entity as the target product entity. In some embodiments, the product entity relation between the second product entity and the first product entity is correlating relation, which may indicate that a first product corresponding to the first product entity is made from a second product corresponding to the second product entity. Exemplarily, a second process step for fabricating the second product entity in the manufacturing process is upstream or on a upper-level above a first process step for fabricating the first product entity, so after the second product is fabricated, the first product is made from the second product. Accordingly, the second product entity may be called an upper-level product entity of the first product entity. For example, in the manufacturing process of a semiconductor display, the panel may be a first product entity, and the glass may be a second product entity, and the glass is an upper-level product entity of the panel.

The product query parameter may comprise but is not limited to at least one of a product identifier, a time range and a product arrival rate. The time range may comprise a start time and an end time for example, or a start time and a time duration set based on the start time.

In an example, when the product query parameter is a product identifier, the corresponding query may be: searching the relational map for a product entity of which property information matches with the product identifier as the target product entity, and using information of one or more associated manufacturing entities of the product entity as product history data. For example, the product history data may be obtained by combining information of manufacturing entities having entity relations with the product entity. For instance, the product history data is obtained by combining information of manufacturing entities having a "passing" relation with the product entity (i.e., equipments through which the product passes). Optionally, these manufacturing entities may also be combined according to temporal property information of the manufacturing entities.

In a further example, when the product query parameters comprise a product arrival rate, a time range and a product identifier, a combined query may be carried out based on these product query parameters, e.g., the product history of a target entity having the product identifier and meeting a requirement of the product arrival rate with a production time falling within the time range is queried. The product arrival rate may be used for screening a product sample set to be analyzed, and it may be obtained by calculating a ratio of the number of first product entities arriving at a specific station to the total number of the first product entities, wherein the first product entities are obtained from one same second product entity. During the manufacturing process of a semiconductor display, the product arrival rate may refer to a percentage of panels made from the same glass that arrive at a detection point, e.g., the percentage may reach 90%. Exemplarily, the number of panels belonging to a certain glass that pass through a station may be counted by gathering all panels passing through that station into the certain glass. If the counted number is N, and the glass is cut into M panels, the product arrival rate at this station is N/M*100%.

Exemplarily, after a time range parameter and a product arrival rate parameter are acquired, a first relation between product entities in the product graph database may be queried according to these parameters, thereby obtaining a first product entity meeting the requirement of product arrival rate parameter. The first relation is for representing entity relations between two product entities in the product graph database. In an example, the first relation represents the first product entity is obtained from/correlated to the second product entity. A ratio of the number of the first product entities arriving at the detection point to the total number of the first product entities may be stored in the relation property of the first relation. Exemplarily, meeting the requirement of product arrival rate parameter means that the stored ratio meets the requirement of product arrival rate parameter.

In an example, the first product entity may be panel for example. The first relation may be Glass←panel, or half-Glass←panel, halfGlass←Glass, i.e., cutting multiple panels from one same glass or half glass.

A second relation between product entities in the product graph database may be queried based on the obtained first product entity, thereby obtaining a second product entity. The second product entity may be glass for example. The second relation is for representing a relation between a defective result of the first product entity and the second product entity.

For instance, a first product entity panel is determined based on the product arrival rate parameter. The product arrival rate parameter indicates a threshold of the product arrival rate. The product arrival rate may be defined as, after a glass is cut into multiple panels, a ratio of the number of the panels arriving at a detection point synchronically or in batches to the total number of the panels into which the glass is cut. Exemplarily, assuming the threshold of the product arrival rate is 80%, when the product arrival rate reaches 80%, it means that 80% of all the panels obtained from the same glass have arrived at the detection point. Now, the second product entity glass corresponding to the multiple panels arriving at the detection point is determined to have met the requirement of the product arrival rate parameter, so the second product entity glass may be used as a target product entity. The target product entity corresponds to a target product for which the product history is queried.

A defective result may be detected when the panels obtained from the second product entity glass undergo product detection upon their arrival at the detection point. A second product entity corresponding to the defective result may be traced by constructing a relation between the defective result of the first product entity and the second product entity beforehand in the relational map. A relation between the defective result of the first product entity and the second product entity may be constructed by performing data extraction on data relations between multiple panels with defective results and a glass. When multiple panels with defective results are obtained, the defective results may be gathered to a corresponding glass based on the first relation between the panel and the glass as mentioned above, thereby determining a defective glass.

Since such gathering is realized based on a relation pre-constructed in the product graph database, there is no need to perform a join operation among multiple linked data sheets, so the query speed of the product graph database according to the embodiments of this disclosure is promoted by about two orders of magnitude as compared with a relational database.

The first product entity and the second product entity may be correlated with each other by a simple production process, so after the existence of a first product entity with a defective result is determined, a possible cause of the defective result may be further found based on a second product entity correlated therewith. In some scenarios, to acquire a product history of the second product entity may be of greater importance in finding possible causes of defects.

Relations between the product entities and the manufacturing entities in the product graph database are queried according to the second product entity, thereby obtaining a product history corresponding to the second product entity. The relations between the product entities and the manufacturing entities are used for representing relations between the second product and the manufacturing implementation bodies thereof.

For example, given that the second product entity is a Glass, the manufacturing entity refers to one or more equipments for manufacturing the Glass, and the factory where the equipments are located, and so on.

In some embodiments, the target product Glass may be determined based on a product identifier and a product arrival rate. For instance, based on a product property relation established beforehand in the product graph database, e.g., a relation of (panel→product ID), a first product entity corresponding to the product identifier may be obtained. Then a second product entity may be determined by performing a relation search according to an inverse process of the manufacturing process of the first product entity. That is, the second product entity may be obtained by querying the property relation of the first product entity: relating to defect (panel→defect) and the entity relation: relating to glass (panel→glass). If a half glass is involved in the manufacturing process, the second product entity may be obtained based on the property relation of the first product entity: relating to defect (panel→defect) and the entity relations: relating to half glass (panel→half glass) and relating to glass (half glass→glass). That is, with the defective panel as a starting point, an inverse search for the Glass is carried out to determine the Glass corresponding to the defective panel. Then manufacturing equipment through which the second product entity Glass passes during the manufacture is determined based on the entity relations of the Glass, and then product history data of the second product entity may be obtained.

For example, given that the panel is directly obtained from the Glass, and a manufacturing process relation between the product entity glass and the manufacturing entities (e.g., equipment, unit and so on) may be determined from the entity relations of e.g., glass→equipment and glass→unit. Assuming the Glass passes through multiple equipments such as A, B, C and D during the manufacturing process of the Glass, a connection relation of a star-shaped structure may be established between the second product entity and each manufacturing entity (i.e., abstract entities of apparatuses A, B, C and D) it passes through. Optionally, a temporal property may be added for each manufacturing entity, which temporal property is for recording a start time and an end time of the passage of the second product entity through the manufacturing entity.

In this way, after the second product entity is determined, a set of manufacturing entities may be obtained by searching the connection relation(s) of a star-shaped structure. Then a temporal sequence in which the second product entity passes through each manufacturing entity may be determined based on the temporal property of each manufacturing entity, and the product history data of the second product entity may be readily obtained by outputting the set of manufacturing entities in the temporal sequence.

According to the embodiments of this disclosure, after the second product entity is determined based on the defective result, a set of manufacturing entities related to the second product entity is obtained by means of the entity relations pre-constructed between the second product entity and the manufacturing entities in the relational map, which effectively shortens the time taken to acquire the product history data. As compared with a relational database in which it is required to join multiple related data sheets in order to query the product history data during the search for defective information of the product through join, the embodiments of this disclosure may trace and query the product history data corresponding to the second product entity by using the relational map stored in the product graph database, which not only effectively saves the query time but also allows to visually present the product history data.

Figure 3:
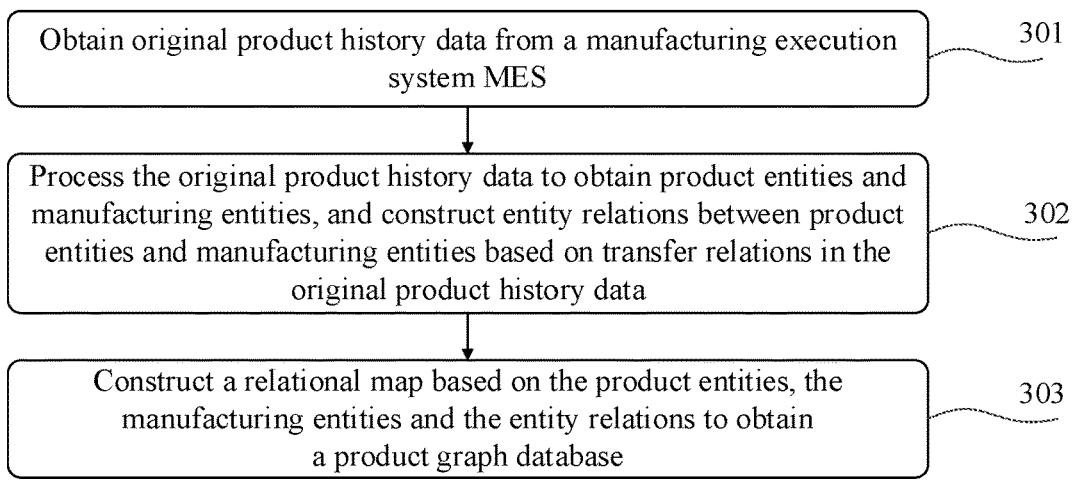
FIG. 3 shows an exemplary flow chart of a construction method of a product graph database according to an embodiment of this disclosure.

FIG. 3 shows an exemplary flow chart of a construction method of a product graph database according to an embodiment of this disclosure. The construction procedure of a product graph database may comprise an off-line constructing process and an on-line updating process.

The off-line constructing process may comprise:

Step 301, obtaining original product history data from a manufacturing execution system MES executing the manufacturing process;

Step 302, processing the original product history data to obtain the product entities and the manufacturing entities, and constructing the entity relations between the product entities and the manufacturing entities based on transfer relations of the original product history data. The transfer relations may refer to the relations between a product and respective manufacturing implementation entities that are incurred by transfer or circulation of the product among the manufacturing implementation entities according to a manufacturing workflow. For example, if a glass GLASS A passes through a unit UNIT1 under an equipment EQP1, the original product history data obtained may comprise information about the passage of GLASS A through UNIT1, and thereby a "passing" relation between the product entity GLASS A and the manufacturing entity EQP1 may be constructed in the relational map, i.e., the relation of GLASS A passing through UNIT1.

Step 303, constructing a relational map based on the product entities, the manufacturing entities and the entity relations to obtain the product graph database.

The original product history data may comprise metadata and operational data. A source end is a location where the metadata is stored and a location (here is an operational data store, ODS for short) where the operational data is stored in the MES.

The processing of the original product history data may comprise loading the original product history data from the source end (i.e., the MES) to a destination end (i.e., the product graph database) after data extraction and transformation (including data cleaning).

Figure 4A:
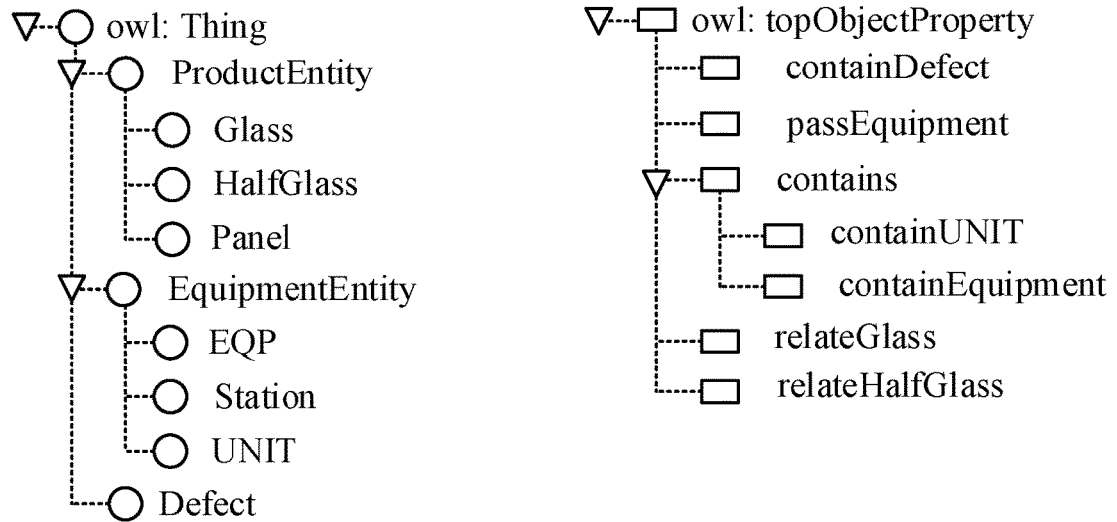
FIG. 4a shows an exemplary representation of an ontology corresponding to the constructed relational map according to an embodiment of this disclosure.

FIG. 4a exemplarily shows an ontology corresponding to a constructed relational map described in OWL (Ontology Web Language), which mainly describes the relations between one entity and another involved in the relational map. As shown in FIG. 4a, class Thing describes entities involved in the relational map, comprising for example: Product Entity (ProductEntity), Equipment Entity (EquipmentEntity) and Defect. The Product Entity comprises Glass, Half Glass (HalfGlass) and Panel. The Equipment Entity comprises Equipment, Station and Unit. Top Object Property (topObjectProperty) describes relational properties in the relational map, comprising for example: containDefect, passEquipment, contains (containUNIT, containEquipment), relateGlass and relateHalfGlass and so on.

Figure 4B:
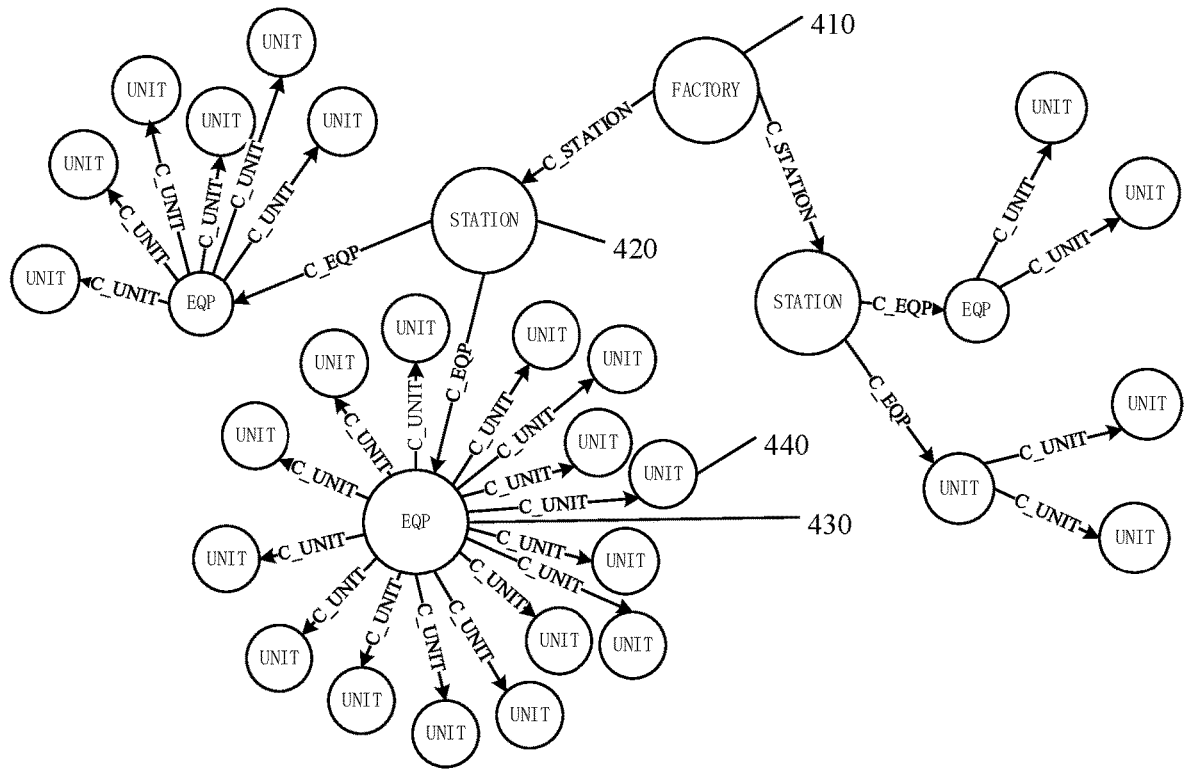
FIG. 4b shows an example of partial graph structures of the relational map according to an embodiment of this disclosure.

FIG. 4b shows an example of partial graph structure of the relational map according to an embodiment of this disclosure. The graph structure is a star-shaped structure, wherein nodes indicated by dots represent entities, and sides between the nodes indicated by straight lines with arrows represent entity relations and words on the sides represent types of the corresponding entity relations. FIG. 4b shows four types of manufacturing entities: factory entities (FACTORY), station entities (STA), equipment entities (EQP) and unit entities (UNIT). Lines C_STATION, C_EQP and C_UNIT with arrows represent that the entity relations between the factory entity and the station entity, the station entity and the equipment entity, the equipment entity and the unit entity are respectively a containing relation. For example, the graph structure shows that factory entity 410 contains (C_STATION) station entity 420, station entity 420 contains (C_EQP) equipment entity 430, and equipment entity contains (C_UNIT) unit entity 440.

In some embodiment, in the construction of a product graph database, speed of ETL and query may be effectively promoted by establishing an index on specific properties of the entities or the entity relations. For example, an index of data transfer relation may be established in property parameters of the relations between manufacturing entities, the relations between manufacturing entities and product entities, and the relations between product entities, so as to rapidly query the transfer state of a product.

In some other embodiments, an identifier property may also be added for the entities and/or entity relations, which identifier property is for uniquely identifying each entity and entity relation. For example, a unique identifier (ID) property may be added for a product entity or manufacturing entity and an index may be established for the ID property. In this way, when updating data for some entities, in particular when the data amount is huge, the speed of data insertion may be promoted significantly by searching the product graph database for these entities based on the ID index. Exemplarily, the product entity panel may have a property of Panel.productID. After an index is established for the property of Panel.productID, use of a single product ID for a history data query may rapidly decrease the data amount of panels to be scanned, thereby promoting the query speed.

In some other embodiments, since most of the history queries need to perform screening based on a time range, it is possible to add a temporal property for the entities and/or the entity relations, and establish an index for the temporal property. For example, in the process of product history data query based on a need of defect analysis, a user may select panels to be traced based on a time range. Since the product entity panel has a temporal property Panel.date, after the establishment of an index for the temporal property Panel.date, performing a query based on a time range may significantly decrease the data amount of panels to be scanned and thereby reduce the query time.

The on-line updating process may comprise: when the entities and/or the entity relations extracted from the original product history data are changed with respect to the relational map stored in the product graph database, updating the relational map based on the changed entities and/or entity relations.

The original product history data may be extracted from the EMS periodically or by means of subscription-and-push. In some embodiments, it is possible to subscribe to the MES system for a change event of the original product history data such that once the MES system detects a change in the original product history data, it will automatically push the changed original product history data.

Figure 5:
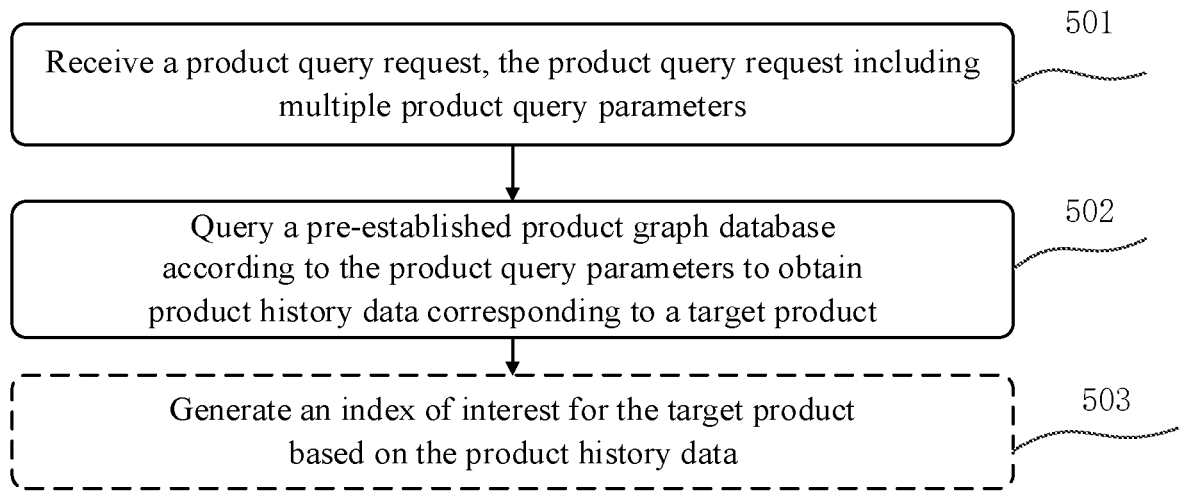
FIG. 5 shows an exemplary flow chart of a further product history query method according to an embodiment of this disclosure.

In some embodiments, after the acquisition of product history data by using the product graph database, the product history data may be utilized to analyze an index of interest, thereby better extracting key information and further promoting the analysis efficiency of the product history data in different applications. FIG. 5 shows an exemplary flow chart of a further product history query method according to an embodiment of this disclosure. The method comprises:

Step 501, receiving a product query request, the product query request including multiple product query parameters;

Step 502, querying a pre-established product graph database according to the product query parameters to obtain product history data corresponding to a target product;

Step 503, generating an index of interest for the target product based on the product history data.

The way of querying the product history data in steps 501 and 502 may be the same as in the query process described with reference to FIGS. 1-4. Additionally, upon receipt of the product query request, it is possible to create a query statement according to the product query parameter, and query the product graph database based on the query statement to obtain the product history data.

The query statement may comprise a multi-hop query across multiple entities in the relational map. As used herein, a multi-hop query may refer to a query of which a query path comprises at least one intermediate entity other than a start entity acting as the start point of the query and a target entity that is the end point of the query. In such a scenario, a directly connected entity relation may be established between the start entity and the end entity, thereby accelerating the query speed. In some embodiments, a direct connection may be established between two entities without entity relations when an occurrence frequency of a multi-hop query is greater than a predetermined threshold.

For example, entity relations Panel-[relateHalfGlass]→HalfGlass-[relateGlass]→Glass initially exist in the relational map. There is no entity relation between Panel and Glass. If frequent queries about the history of related Glass of Panel are detected, i.e., a multi-hop query across three entities Panel, HalfGlass and Glass is used frequently, e.g., the occurrence frequency of the multi-hop query has exceeded a predetermined threshold, the relational map may be modified so as to directly establish connection of Panel-[R_Glass]→Glass between the entities of Panel and Glass. Actual tests have shown that the connection may accelerate the query speed by 20%.

In some embodiments, in the relational map, data may be stored in the entity relations between entities. For example, the start time and the end time of passage of Glass through a certain equipment and/or a certain unit may be stored in the relational properties of Glass. In a further example, coordinates of defective points and counting of defective points may be stored in the relational property of Panel relate defect. By storing more information, e.g., temporal information and statistical information, in the properties of the entity relations, more query dimensions and higher query accuracy may be provided.

In some embodiments, step 503 may further comprise: obtaining a predetermined index of interest calculation template; calculating the index of interest for the target product using the product history data of the target product according to the index of interest calculation template.

By presetting a template for the calculation of the index of interest, key information about the product tracing may be obtained more rapidly based on the product history data, which enables a rapider tracing in case of a product quality problem, thereby effectively promoting the production efficiency of the EMS system.

Figure 6:
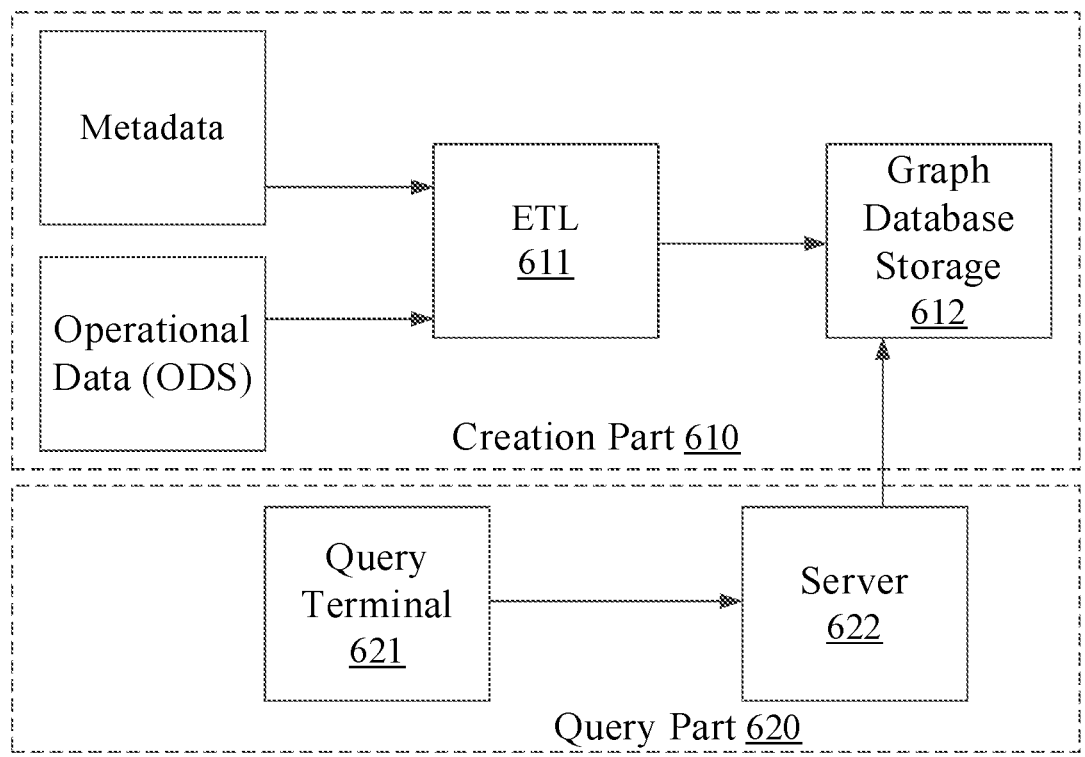
FIG. 6 shows the operation principle of a product history query system according to an embodiment of this disclosure.

The product history query solution according to an embodiment of this disclosure will be explained in a scenario of yield analysis by taking the manufacturing process of a display device as an example. FIG. 6 shows the operation principle for a product history query system according to an embodiment of this disclosure. The system comprises a product graph database creation part 610 and a query part 620.

The product graph database creation part 610 comprises an ETL module 611 and a graph database storage module 612. The query part 620 comprises a query terminal 621 and a server 622.

The product graph database creation part 610 is arranged for modeling the manufacturing process of EMS to construct a corresponding relational map. In the constructed relational map, the correlating relations between the factories, the manufacturing equipment, the equipment and the manufactured products of the EMS are organized in the form of graphs. In some embodiments, the relational map may comprise a metadata layer and a data layer. The metadata layer is arranged for constructing relations between manufacturing entities such as the factories and equipment. Exemplarily, the metadata layer may comprise manufacturing entities such as factories, stations, equipment, and units. The metadata layer may further comprise relations between the manufacturing entities, e.g., a factory contains a station (factory→station), and a station contains equipment (station→equipment), and equipment contains a unit (equipment→unit). The data layer is arranged for constructing relations related to the product entities. Exemplarily, the data layer may describe the relations between the product entities and the manufacturing entities as product passing station, and the properties of the product entities as product defects, product IDs and so on.

In a scenario of display manufacture, the data layer may involve entities such as glass, half glass, panel, defect and product ID, as well as corresponding relations, e.g., panel relating to half glass (panel→half glass), half glass relating to glass (half glass→glass), panel relating to defect (panel→defect), panel belonging to product (panel→product ID), glass passing through equipment (glass→equipment), glass passing through unit (glass→unit), half glass passing through equipment (half glass→equipment), and half glass passing through unit (half glass→unit).

The relations in the relational map may be represented in the form of triplets. For example, relation "glass passing through equipment" may be represented by Glass-pass-Equipment, and relation "panel related to half panel" may be represented by Panel-relate-HalfGlass.

In some embodiments, when constructing the ontology during the construction of the relational map of the manufacturing process, since some equipment operations may be required occasionally, it is possible to choose based on requirements whether to filter out these equipment operations, i.e., not to describe the entities or entity relations of these equipment operations in the relational map. In some other embodiments, some product history analyses, e.g., machine error analysis, need to be analyzed among manufacturing entities (e.g., equipment or unit) of a same group, so group information of the manufacturing entities is constructed. In this example, in the construction of a relational map, a group property may be added for the manufacturing entities so as to store related group information. In some further embodiments, since a product may pass through one same manufacturing entity (e.g., unit) multiple times in the manufacturing process, it is possible to expand a single unit that has been passed through multiple times into multiple units in the relational map according to the process steps and add a process step property for the unit so as to distinguish different process steps involving this unit. For example, two aluminum layers are to be made in one process, so one same unit will be passed through twice. In this way, the unit may be represented as UNIT 1 in the relational map for the first passage, and be represented as UNIT 2 for the second passage. As such, this process may be described as UNIT1-UNIT2, indicating that the first passage is done by UNIT1 and the second passage is done by UNIT 2.

The ETL module 611 is for loading the acquired original data of a business system (e.g., the MES) to the product graph database according to the constructed relational map after extraction and transformation. The original data comprises metadata and operational data. The ETL module may be configured to update metadata and acquire product data (e.g., operational data ODS) and so on. Exemplarily, the ETL module may use Pentaho as an ETL tool, which achieves better expandability and flexibility while accelerating the development.

The graph database storage module 612 is arranged for storing the product graph database. In some embodiments, the product graph database may adopt a database supporting a property graph model. Optionally, indexes may be established for commonly used queries, e.g., an index may be established on a query with a high use frequency, so as to support the query requirement of real-time analysis.

The query part 620 is arranged for initiating a query to the product graph database and receiving a returned query result. In some embodiments, the query part 620 further provides a product index of interest generated based on the query result.

The query terminal 621 receives product query parameters. The product query parameters may comprise for example defect of the target product, time range (e.g., the time range of production time) or product arrival rate related to the target product. These product query parameters may be manually inputted by the user or preset by the system. The query terminal 621 will pack the product query parameters in a product query request which will be sent to the server 622.

The query terminal 621 is connected with the server 622 via a communication network. The query terminal sends a query request to the server which feeds back a query result to the query terminal based on the query request.

Figure 7:
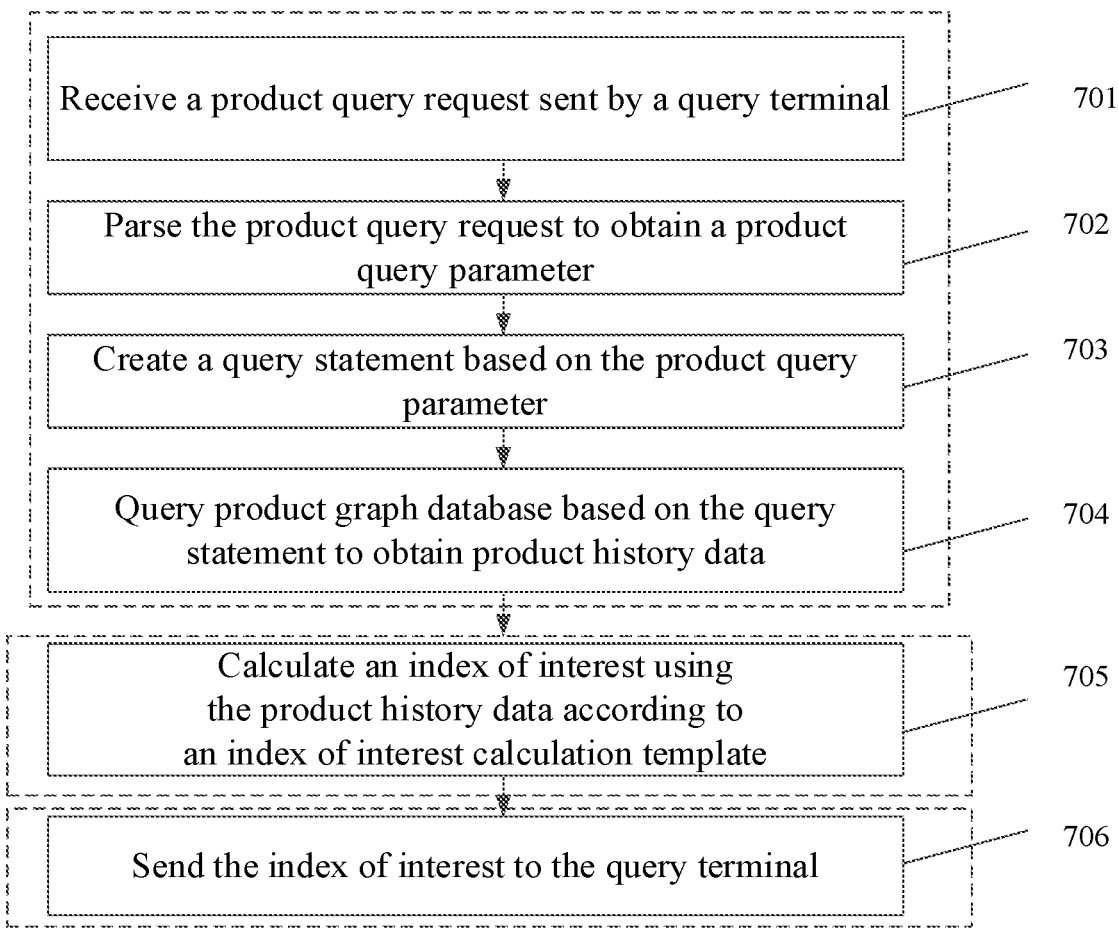
FIG. 7 shows an exemplary flow chart of a product history query method according to an embodiment of this disclosure.

FIG. 7 shows a flow chart of a product history query method according to an embodiment of this disclosure. The method may be implemented by the server 622 in FIG. 6. The method comprises:

Step 701, receiving a product query request sent by the query terminal;

Step 702, parsing the product query request to obtain a product query parameter;

Step 703, invoking a pre-stored query statement template according to the product query parameter to create a query statement for querying the product graph database;

Step 704, querying the product graph database based on the created query statement to obtain product history data.

Examples of the query statement and the resultant product history data are given as follows.

First query statement Q1 is used for searching for product history data of glass related to the panel, and the product query parameter is panel product identifier, panel time range and panel defect.

Q1:"Match (panel:PANEL)-[:R_GLASS]→(glass:GLASS)/*search for GLASS related to PANEL*/

Optional match (panel)-[:relateDefect]→(dft:DEFECT)/*optionally search for defective panel*/ where panel.productID={productID} and {startDate}<=panel.date<={endDate} and dft.ID={dftID}/*panel product identifier is productID, panel time range falls between startDate and endDate, and defect identifier is dftID*/ with glass as glass, count(panel) as cnt, count(dft) as dftCnt/*for glass, panel count as cnt, defect count as dtfCnt*/match (glass)-[:PASS]→(eqp:EQP)/*search for equipments through which the glass passes*/ return eqp.group as group, eqp.ID as ID, sum(cnt) as total, sum(dftCnt) as dftCnt"; /*return eqp.group as group, eqp.ID as identifier, sum cnt as a total; sum dftCnt as the count of defects*/

The product history data returned by the first query statement Q1 comprises equipment group through which the defective panel passes, equipment identifier, panel total, and defective panel total.

Second query statement Q2 is used for searching for product history data of glass related to the panel, and the product query parameter is panel product identifier, panel time range and panel defect.

Q2: "Match (panel:PANEL)-[:R_GLASS]→(glass: GLASS)/*search for GLASS related to PANEL*/

Optional match (panel)-[:relateDefect]→(dft:DEFECT)/ *optionally search for defective panel*/ where panel.productID={productID} and {startDate}<=panel.date<={endDate} and dft.ID={dftID}/ *panel product identifier is productID, panel time range falls between startDate and endDate, and defect identifier is dftID*/return count(panel) as totalPanel, count(dft) as totalDft"; /*return panel count as panel total, dft count as defect total*/

The product history data returned by the second query statement Q2 comprises panel total, and defective panel total.

Then, the server 622 may send the product history data to the query terminal 621. The query terminal 621 may visually display the product history data.

Optionally, the server 622 may further analyze the product history data so as to extract key information. For example, an index of interest for the target product may be generated based on the product history data.

Step 705, calculating the index of interest for the product to be queried (i.e. the target product) using the product history data according to the pre-stored index of interest calculation template, e.g., the index of interest for defective Glass to be queried. For example, the corresponding index of interest calculation template may be acquired based on the product history data, and the index of interest for the target product may be calculated using the product history data of the target product according to the index of interest calculation template.

The index of interest calculation template using JsonPath syntax is shown exemplarily as follows:

```
{"total":Q2[0].totalPanel, /*total: obtain panel total by using Q2 query statement*/
"dftTotal":Q2[0].totalDft,/*defect total: obtain defect total by using Q2 query statement*/
"iv": {
"group":Q1.group, /* group: obtain group identifier by using Q1 query statement*/
"eqpID":Q1.ID, /* equipment identifier: obtain equipment identifier by using Q1 query statement*/
"iv":Math.IV(Q2[0].totalPanel, Q2[0].totalDft, Q1[*].dftCnt, Q1[*].total)/*calculate index using panel total, defect total, defect count and total*/
}
}
```

In the calculation template, the product history data comprises the panel total and the defect total of a certain glass obtained by querying with the second query statement as well as the panel total and the defect total of all glasses corresponding to a certain equipment group obtained by querying with the first query statement. The calculated index of interest is panel defect rate.

Step 706, the server 622 sends the index of interest to the query terminal 621. For example, the server 622 may include in a notification message the calculated index of interest and send it to the query terminal.

By calculating the index of interest for the product according to a preset index of interest calculation template, complicated procedure of search and calculation through joining of data sheets in related arts may be avoided, which effectively promotes the query efficiency of the index of interest and saves the query time of the index of interest.

Flow charts and block diagrams in the drawings illustrate possible systematic architectures, functions and operations that may be implemented by the system, the method and the computer program product according to various embodiments of this disclosure. In this regard, each box in the flow charts or the block diagrams may represent a module, a program segment or a portion of codes. The module, the program segment or the portion of codes comprises one or more executable instructions for implementing prescribed logic functions. It should also be noted that in some alternative implementations, the functions indicated in the boxes may also be performed in a sequence different from that indicated in the drawings. For example, two consecutive boxes may actually be executed substantially concurrently, and sometimes they may also be executed in an opposite sequence, which depends on the functions involved. It should also be noted that each box in the block diagrams and/or the flow charts and a combination of the boxes in the block diagrams and/or the flow charts, e.g., an ETL module, may be implemented by means of a dedicated hardware-based system for executing the prescribed functions or operations, or by means of a combination of dedicated hardware and computer instructions.

Figure 8A:
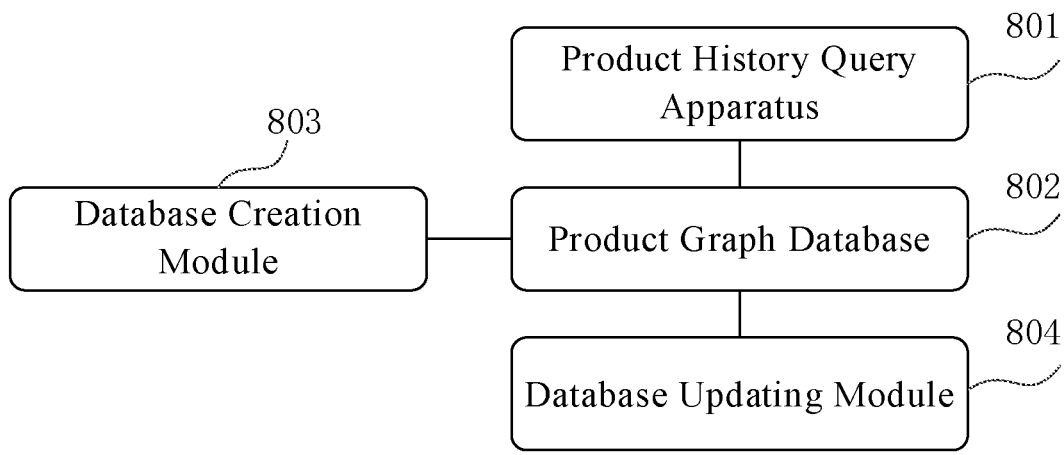
FIG. 8a shows a schematic structure view of a product history query system according to an embodiment of this disclosure.

FIG. 8a shows a schematic structure view of a product history query system according to an embodiment of this disclosure. The system may comprise a product graph database 801 and a product history query apparatus 802.

The product graph database 801 is arranged for storing a relational map constructed based on the manufacturing process of a target product. The relational map describes entities involved in the manufacturing process and entity relations between the entities. The entities include both product entities and manufacturing entities.

The product history query apparatus 802 is arranged for receiving a product query request including at least one product query parameter; querying the product graph database according to the product query parameter to obtain product history data corresponding to the target product. The querying comprises: searching for a product entity corresponding to the target product as a target product entity in the relational map according to the product query parameter, searching for one or more associated manufacturing entities of the target product entity according to the entity relations described by the relational map, and obtaining the product history data based on the associated manufacturing entities.

In some embodiments, the product history data is obtained by combining the associated manufacturing entities according to a temporal property of the entity relations between the target product entity and the associated manufacturing entities.

In some embodiments, the product history query apparatus 802 is configured to create a query statement according to the product query parameter and search the product graph database according to the query statement.

The product history query apparatus 802 may be arranged for implementing various product history query methods according to the embodiments of this disclosure, including the method described in FIG. 2.

In some embodiments, the product history query apparatus 802 is configure to search for a product entity corresponding to the target product as a target product entity according to a product identifier; search for based on the target product entity associated manufacturing entities having entity relations therewith; combine the associated manufacturing entities according to a temporal property into product history data corresponding to the target product.

In some embodiments, the product history query apparatus 802 is arranged for querying a first relation between product entities in the product graph database according to a time range parameter and a product arrival rate parameter, thereby obtaining a first product entity meeting the requirement of product arrival rate parameter, the first relation being used for representing the correlating relation between the first product entity and the second product entity. A second relation between product entities in the product graph database is queried based on the first product entity meeting the requirement of product arrival rate parameter, thereby obtaining the second product entity that has the second relation with the first product entity. The second relation is used for representing a correlating relation between a defective result of the first product entity and the second product entity. A third relation between product entities and manufacturing entities in the product graph database is queried based on the second product entity, thereby obtaining product history data corresponding to the second product entity. The third relation is used for representing association relations between the second product entity and the manufacturing entities.

In some embodiments, the system further comprises a database creation module 803 for creating a product graph database. The database creation module 803 is configured to obtain original product history data from a manufacturing execution system MES executing the manufacturing process; process the original product history data to obtain the product entities and the manufacturing entities, and construct the entity relations between the product entities and the manufacturing entities based on transfer relations of the original product history data; construct a relational map based on the product entities, the manufacturing entities and the relations to obtain the product graph database. In some embodiments, the database creation module 803 may be a database creating circuit. Alternatively, the database creation module 803 may also be implemented by a processor executing a corresponding creation program.

The system may further comprise a database updating module 804. The database updating module 804 is arranged for updating the product graph database, and configured to: in response to at least one of the entities and the entity relations extracted from the original product history data being changed with respect to the relational map stored in the product graph database 801, update the relational map based on the changed entities and entity relations, and store the updated relational map in the product graph database 801. In some embodiment, the database updating module 804 is configured to: in response to the query to the product graph database 801 comprising a multi-hop query across a plurality of entities in the relational map and an occurrence frequency of the multi-hop query being greater than a predetermined threshold, establish a directly connected entity relation between a start query entity and an end query entity corresponding to a start and an end of the multi-hop query in the relational map.

In some embodiments, the database updating module 804 may be a database updating circuit. Alternatively, the database updating module 803 may also be implemented by a processor executing a corresponding updating program.

The product history query apparatus 801 is further configured to create a query statement for querying the product graph database according to the product query parameters; querying the product graph database based on the query statement to obtain corresponding product history data of the target product.

The product history query apparatus 801 is further configured to calculate an index of interest for the target product based on the product history data.

The product history query apparatus 801 is further configured to calculate an index of interest for the target product using the product history data of the target product according to an index of interest calculation template.

In a scenario of product yield analysis, the resultant index often depends on a multi-level gathering value. The system according to the embodiments of this disclosure stores a relational map corresponding to the manufacturing process by using a product graph database, which allows direct gathering of defect information to an upper-level product according to multiple relations between the product to be queried and the corresponding upper-level product during the query of product history data, thereby shortening the time taken to acquire the product history data of the upper-level product.

The gathering of this disclosure is realized based on a relation pre-constructed in the product graph database, so no join operation is needed among multiple linked data sheets, and thus the query speed is promoted by about two orders of magnitude as compared with a relational database.

Figure 8B:
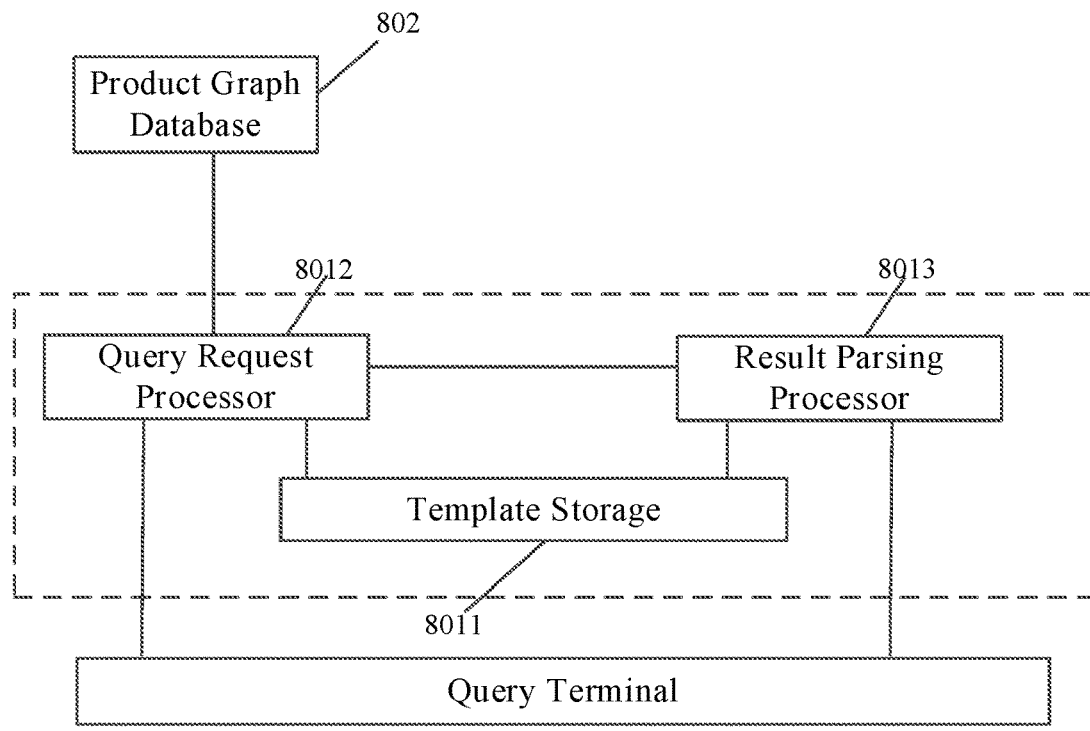
FIG. 8b shows a schematic structure view of a product history query apparatus according to an embodiment of this disclosure.

FIG. 8b shows a schematic structure view of a product history query apparatus according to an embodiment of this disclosure. The product history query apparatus may be implemented in a query terminal or a server. The product history query apparatus comprises: a template storage 8011, a query request processor 8012 and a result parsing processor 8013.

The template storage 8011 is arranged for storing a query statement template and/or an index of interest calculation template. The query statement template defines an index to be queried, and it may be written in a Cypher or Gremlin language. The index of interest calculation template defines a calculation method for calculating the query result returned by the product graph database 802. The template storage is arranged for coordinating the user's query request, the interaction with the product graph database and the parsing manner of the query result.

The query request processor 8012 is arranged for receiving a product query request and requesting/invoking a query statement template from the template storage 8012 according to a product query parameter, creating a query statement using the product query parameter based on the query statement template, and querying the product graph database 802 according to the query statement. In some embodiments, the query request processor 8012 may receive product history data corresponding to the product to be queried and fed back by the product graph database.

The result parsing processor 8013 is arranged for receiving product history data fed back by the product graph database; acquiring an index of interest calculation template from the template storage 8011 based on the received product history data, and calculating the index of interest for the product to be queried using the product history data according to the index of interest calculation template. The result parsing processor 8013 is further arranged for sending the index of interest for the product to be queried to the query terminal.

It should be understood that the operations and features described above for the method are also applicable to the product history query apparatus and units comprised therein. The product history query apparatus may be implemented in a browser of an electronic device or other security applications, or loaded to a browser of an electronic device or other security applications by downloading. The corresponding units in the product history query apparatus may cooperate with the corresponding units in the electronic device so as to implement the solutions in the embodiments of this disclosure.

In some embodiments, the product history query apparatus according to the embodiments of this disclosure may be implemented by an electronic device comprising a memory, a processor and a computer program stored on the memory and executable on the processor. In the electronic device, the computer program, when executed by the processor, causes the processor to implement the product history query methods according to the embodiments of this disclosure.

The divisions between the modules or units mentioned in the detailed description above are not compulsory. In fact, according to the embodiments of this disclosure, features and functions of two or more modules or units described above may be embodied in one module or unit. On the contrary, features and functions of one module or unit described above may be further divided and embodied by a plurality of modules or units.

Figure 9:
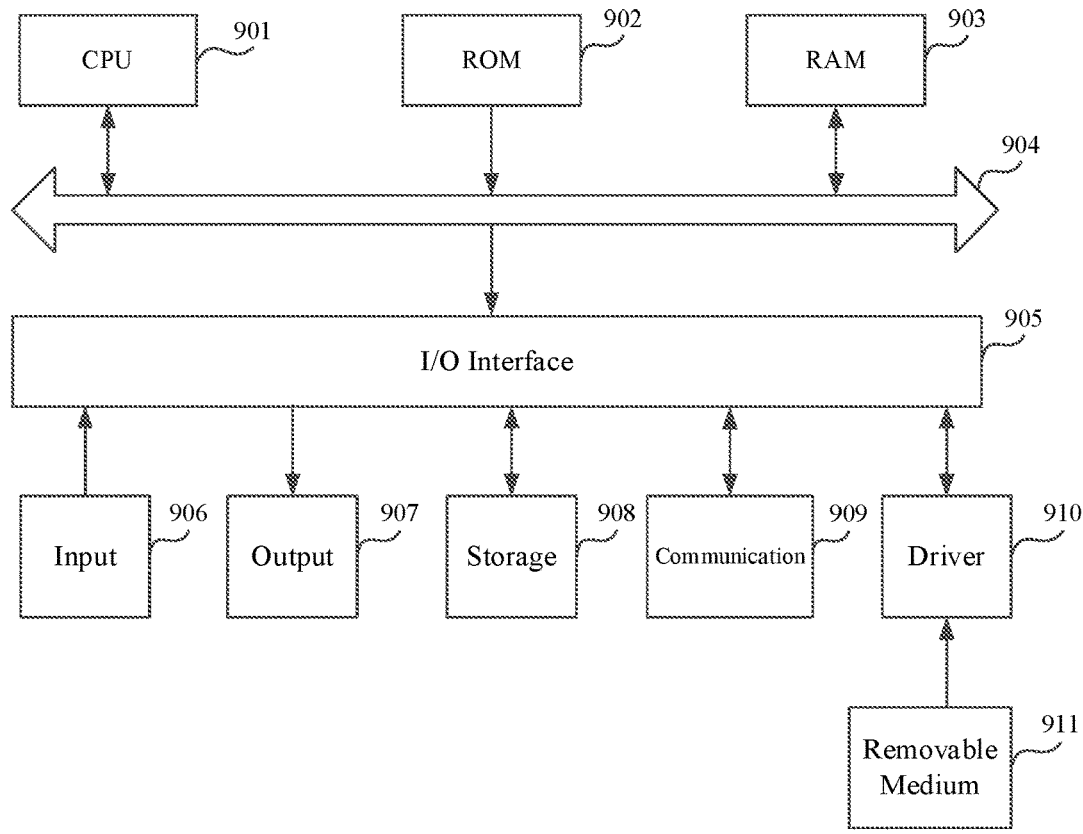
FIG. 9 shows a schematic structure view of a computer system adapted to implement a product history query solution according to an embodiment of this disclosure.

FIG. 9 shows a schematic structure view of a computer system adapted to implement a product history query solution according to an embodiment of this disclosure.

As shown in FIG. 9, the computer system comprises a central processing unit (CPU) 901, which may perform various appropriate actions and processing based on programs stored in the read-only memory (ROM) 902 or programs loaded to the random-access memory (RAM) 903 from a storage part 908. Various programs and data required for the operation of a system 900 are stored in the RAM 903. CPU 901, ROM 902 and RAM 903 are connected with each other via a bus 904. An input/output (I/O) interface 905 is connected to the bus 904.

The following components are connected to the I/O interface 905: an input part 906 including a keyboard, a mouse and so on; an output part 907 including a cathode-ray tube (CRT), a liquid crystal display (LCD) for instance and a loudspeaker and so on; a storage part 908 including a hard disc and so on; and a communication part 909 of a network interface card including a LAN card, a modem, etc. The communication part 909 executes communication processing via a network such as Internet. A driver 910 is also connected to the I/O interface 905 as desired. A removable medium 911 such as a magnetic disc, an optical disc, a magneto-optical disc, a semiconductor storage and so on, is stalled on the driver 910 as desired such that the computer program read out therefrom is installed in the storage part 908 as desired.

In particular, the product history query solution according to the embodiments of this disclosure may be implemented as a computer software program. For example, an embodiment of this disclosure provides a computer program product, comprising a computer program carried on a machine-readable medium, and the computer program comprises program codes for implementing the method shown in the flow charts. In such an embodiment, the computer program may be downloaded and installed from the network via the communication part 909, and/or installed from the removable medium 911. The computer program, when executed by the central processing unit (CPU) 901, implements the above functions defined in the system of this disclosure.

It should be noted that, the computer-readable medium shown in this disclosure may be a computer-readable signal medium or a non-transitory computer-readable storage medium or any combination of the two. The computer-readable storage medium may be, for example, but is not limited to, an electrical, magnetic, optical, electromagnetic, infrared, or semiconductor system, apparatus, or device, or any combination of the above. More specific examples of the computer-readable storage medium may include, but are not limited to: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In this disclosure, the computer-readable storage medium may be any tangible medium that contains or stores a program, and the program may be used by or in combination with an instruction execution system, apparatus, or device. In this disclosure, the computer-readable signal medium may contain a data signal propagating in a baseband or as a part of a carrier wave, in which computer-readable program codes are carried. This propagated data signal may take many forms, including but not limited to electromagnetic signal, optical signal, or any suitable combination of the above. The computer-readable signal medium may also be any computer-readable medium other than a computer-readable storage medium, which computer-readable medium may send, propagate, or transmit the program for use by or in combination with the instruction execution system, apparatus, or device. The program codes contained on the computer-readable medium may be transmitted by any suitable medium, including but not limited to: wireless, wire, optical cable, RF, etc., or any suitable combination of the above.

The units or modules described in the embodiments of this disclosure may be implemented by software or by hardware. The described units or modules may also be provided in the processor, for example, described as: a processor comprising a query sub-module, wherein the terms of these units or modules do not constitute a limitation to the unit or module per se under certain circumstances, for example, the query sub-module may also be described as "a module for receiving a product query request".

In another aspect, this disclosure further provides a non-transitory computer-readable storage medium, and the computer-readable storage medium may be contained in the electronic device described in the above embodiments; or it may exist independently without being integrated into the electronic device. The computer-readable storage medium stores one or more programs, and when the programs are executed by one or more processors, the processors implement the product history query method according to the embodiments of this disclosure.

What is described above is only preferred embodiments of this disclosure and explanations of the employed technical principles. Those skilled in the art should understand that the scope of disclosure of the present application is not limited by the technical solutions formed by a specific combination of the above technical features, but instead, it should also cover other technical solutions formed by any random combination of the above technical features or equivalent features thereof without deviating from the above disclosure concept, for example, technical solutions formed by replacing the above features with those disclosed in the present application or other technical features having similar functions.

The invention claimed is:

1. A method for querying a product history, comprising:
receiving a product query request to a product graph database from a query device, the product query request including at least one product query parameter for a target product, the product graph database storing a relational map constructed based on a manufacturing process of the target product, the relational map describing entities including product entities and manufacturing entities and entity relations between the entities involved in the manufacturing process;
querying the product graph database according to the product query parameter to obtain product history data of the target product, the querying comprising:
searching for a product entity corresponding to the target product as a target product entity in the relational map according to the product query parameter;
searching for one or more associated manufacturing entities of the target product entity according to the entity relations described by the relational map;
obtaining the product history data based on the associated manufacturing entities; and
sending a notification message to the query device to notify the query device of the obtained product history data;
wherein prior to receiving the query request, the method further comprises creating the product graph database by performing operations comprising:
obtaining original product history data from a manufacturing execution system (MES) executing the manufacturing process;
processing the original product history data to obtain the product entities and the manufacturing entities, and constructing the entity relations according to transfer relations in the original product history data; and
constructing the relational map according to the product entities, the manufacturing entities and the entity relations so as to create the product graph database.

2. The method according to claim 1, wherein the searching for the product entity corresponding to the target product as the target product entity comprises:
searching for a product entity of which property information matches with the product query parameter as the target product entity according to the entities described by the relational map,
wherein the associated manufacturing entities are manufacturing entities having entity relations with the target product entity in the relational map.

3. The method according to claim 2, wherein the product query parameter comprises at least one of a product identifier, a time range or a product arrival rate of the target product.

4. The method according to claim 1, wherein the searching for a product entity corresponding to the target product as the target product entity comprises:
searching for a product entity of which related property information matches with the product query parameter as a first product entity according to the entities or entity relations described by the relational map, and
searching for a second product entity related to the first product entity according to the product entity relations between product entities described by the relational map, and determining the second product entity as the target product entity,
wherein the product entity relation between the second product entity and the first product entity is correlating relation, and a product corresponding to the first product entity is made from a product corresponding to the second product entity.

5. The method according to claim 4,
wherein the product query parameter comprises a product arrival rate, the product arrival rate being a ratio of the number of first product entities that arrive at a specific station to the total number of first product entities, the first product entities being obtained from one same second product entity, and
wherein the searching for the product entity corresponding to the target product as the target product entity comprises:
searching for a first relation between product entities in the relational map according to the product arrival rate to obtain a first product entity that meets a requirement of the product arrival rate, the first relation indicating that the first product entity is obtained from the second product entity; and
searching for a second relation between product entities in the relational map according to the first product entity to obtain a second product entity having the second relation with the first product entity as the target product entity, the second relation indicating that a defective result of the first product entity is related to the second product entity.

6. The method according to claim 1,
wherein the product graph database supports a property graph model, and the property graph model comprises a metadata layer and a data layer,
wherein the metadata layer is arranged for constructing the manufacturing entities and the entity relations between manufacturing entities, and
wherein the data layer is arranged for constructing the product entities, the entity relations between product entities and the entity relations between product entities and manufacturing entities.

7. The method according to claim 1, further comprising updating the product graph database by performing operations comprising:
in response to at least one of the obtained entities and the constructed entity relations being changed with respect to the relational map stored in the product graph database, updating the relational map according to the changed entities and/or entity relations; and
storing the updated relational map in the product graph database.

8. The method according to claim 1, further comprising updating the product graph database by performing operations comprising:
in response to a query to the product graph database comprising a multi-hop query across a plurality of entities in the relational map and an occurrence frequency of the multi-hop query being greater than a predetermined threshold, modifying the relational map to establish a directly connected entity relation between a start query entity and an end query entity corresponding to a start and an end of the multi-hop query; and
storing the modified relational map in the product graph database.

9. The method according to claim 1, wherein prior to querying the product graph database according to the product query parameter, the method further comprises:
parsing the product query request to obtain the product query parameter; and invoking a corresponding query statement template according to the product query parameter to create a query statement for querying the product graph database, wherein querying the product graph database according to the product query parameter comprises querying the product graph database according to the query statement to obtain the product history data of the target product.

10. The method according to claim 1, further comprising:
generating an index of interest for the target product according to the product history data; and
including the generated index of interest in the notification message.

11. The method according to claim 10, wherein the generating the index of interest for the target product according to the product history data comprises:
obtaining a corresponding index of interest calculation template according to the product history data; and
calculating the index of interest for the target product using the product history data according to the index of interest calculation template.

12. The method according to claim 1, wherein the generating the product history data according to the associated manufacturing entities comprises:
combining the associated manufacturing entities according to a temporal property of the entity relations between the target product entity and the associated manufacturing entities to obtain the product history data.

13. A non-transitory computer-readable storage medium, having a computer program stored thereon, wherein the computer program, when executed by a processor, causes the processor to implement the method according to claim 1.

14. A system for querying a product history, comprising:
a database server, configured to store a product graph database, which stores a relational map constructed based on a manufacturing process of a target product, the relational map describing entities including product entities, manufacturing entities and entity relations between the entities involved in the manufacturing process; and
a product history query apparatus, configured to receive a product query request including at least one product query parameter for the target product from a query device, send the product query request to the database server so that the product graph database is queried according to the product query parameter to obtain product history data corresponding to the target product by searching for a product entity corresponding to the target product as a target product entity in the relational map according to the product query parameter, searching for one or more associated manufacturing entities of the target product entity according to the entity relations described by the relational map, and obtaining the product history data according to the associated manufacturing entities, and send a notification message to the query device to notify the query device of the obtained product history data;
wherein the system further comprises a database creating circuit configured to obtain original product history data from a manufacturing execution system IVIES executing the manufacturing process; process the original product history data to obtain the product entities and the manufacturing entities, and construct the entity relations according to transfer relations in the original product history data; and construct the relational map according to the product entities, the manufacturing entities and the entity relations so as to obtain the product graph database.

15. An electronic device, comprising a memory, a processor and a computer program stored on the memory and executable on the processor, wherein the computer program, when executed by the processor, causes the processor to performing operations comprising:
receiving a product query request to a product graph database from a query device, the product query request including at least one product query parameter for a target product, the product graph database storing a relational map constructed based on a manufacturing process of the target product, the relational map describing entities including product entities and manufacturing entities involved in the manufacturing process and entity relations between the entities;
querying the product graph database according to the product query parameter to obtain product history data of the target product, the querying comprising:
searching for a product entity corresponding to the target product as a target product entity in the relational map according to the product query parameter;
searching for one or more associated manufacturing entities of the target product entity according to the entity relations described by the relational map; and
obtaining the product history data according to the associated manufacturing entities; and
sending a notification message to the query device to notify the query device of the obtained product history data;
wherein the processor is further configured to obtain original product history data from a manufacturing execution system (IVIES) executing the manufacturing process, process the original product history data to obtain the product entities and the manufacturing entities, construct the entity relations according to transfer relations in the original product history data, and construct a relational map according to the product entities, the manufacturing entities and the entity relations so as to obtain the product graph database.

16. The electronic device according to claim 15, wherein the processor is further configured to in response to a query to the product graph database comprising a multi-hop query across a plurality of entities in the relational map and an occurrence frequency of the multi-hop query being greater than a predetermined threshold, modify the relational map to establish a directly connected entity relation between a start query entity and an end query entity corresponding to a start and an end of the multi-hop query, and store the modified relational map in the product graph database.

17. The electronic device according to claim 15, wherein the processor is further configured to obtain a corresponding query statement template from a template storage according to the product query parameter, create a query statement using the product query parameter according to the query statement template, and query the product graph database according to the query statement.

18. The electronic device according to claim 15, wherein the processor is further configured to receive product history data of the target product returned by the product graph database, obtain an index of interest calculation template from a template storage according to the product history data, and calculate an index of interest for the target product using the product history data according to the index of interest calculation template.

* * * * *